United States Patent [19]
Hodgson

[11] 3,863,952
[45] Feb. 4, 1975

[54] FIFTH WHEEL KING PIN LOCK COMBINATION

[76] Inventor: Donald W. Hodgson, 1646 10th St., Arcata, Calif. 95521

[22] Filed: Dec. 6, 1973

[21] Appl. No.: 422,437

[52] U.S. Cl.............................. 280/434, 280/432
[51] Int. Cl........................................... B62d 53/12
[58] Field of Search.................... 280/434, 432, 433

[56] References Cited
UNITED STATES PATENTS

| | | | |
|---|---|---|---|
| 2,726,878 | 12/1955 | Fontaine | 280/434 |
| 3,325,185 | 6/1967 | Higby | 280/432 |
| 3,463,512 | 8/1969 | Hodgson | 280/432 |

*Primary Examiner*—Leo Friaglia

[57] ABSTRACT

In a fifth wheel, the king pin, forming one-half of the fifth wheel structure, is locked to the second half of the fifth wheel by means of a horizontally slideable locking bolt. A combined trigger and latching structure projects into the opening in the second half structure which receives the king pin. Vertical translation of the king pin relative to the second half engages the trigger which in turn vertically pivots the latch out of latching engagement with the spring biased locking bolt, whereby the locking bolt slides horizontally into locking engagement with the king pin. The king pin is unlocked from the second half by withdrawing the locking bolt. Withdrawal of the locking bolt is coupled via a catch to the latch in such a manner as to also withdraw the latch. The latch is spring biased to latch the bolt in a cocked position to be triggered by the receipt of the next king pin.

6 Claims, 7 Drawing Figures

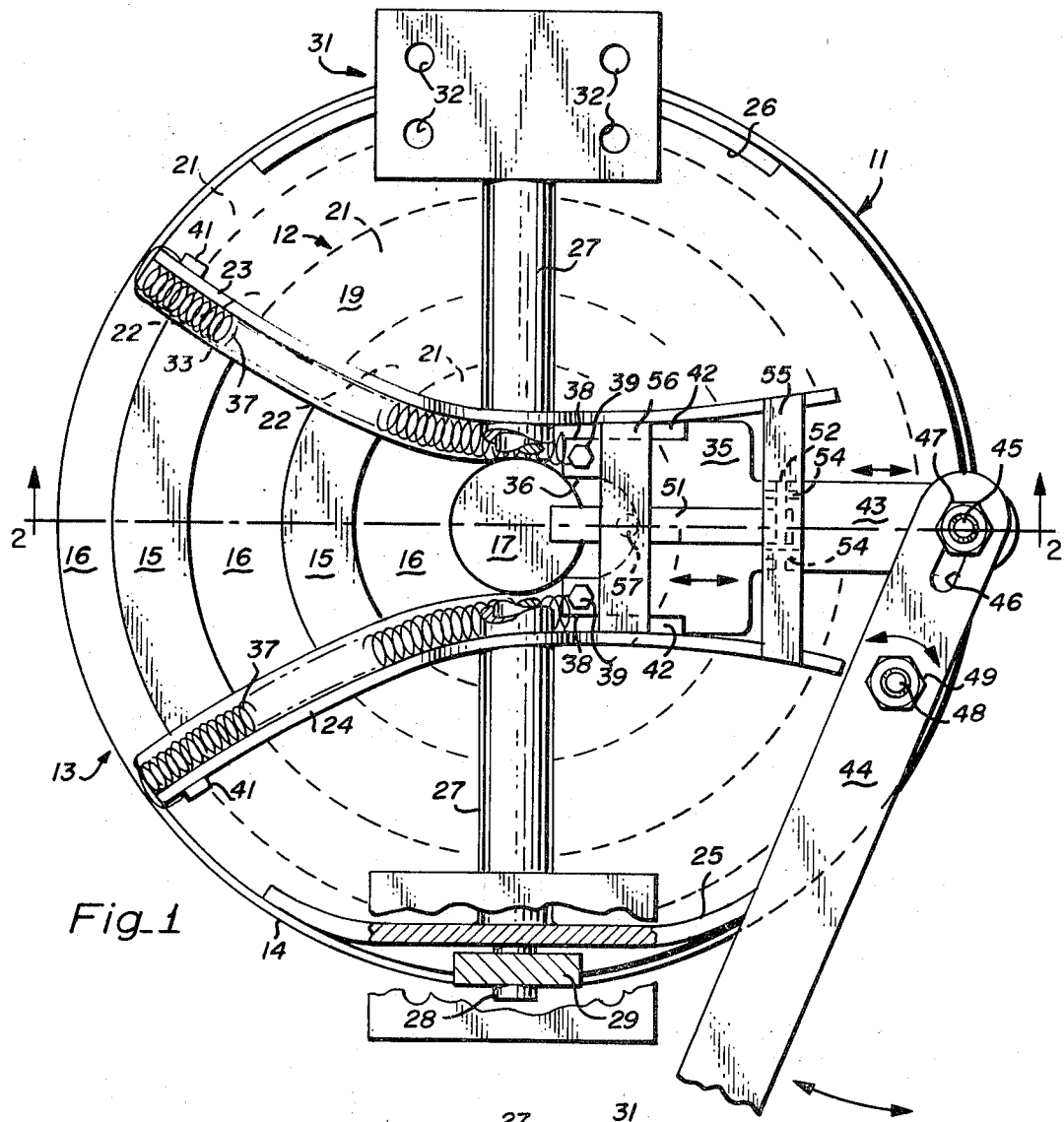
Fig_1
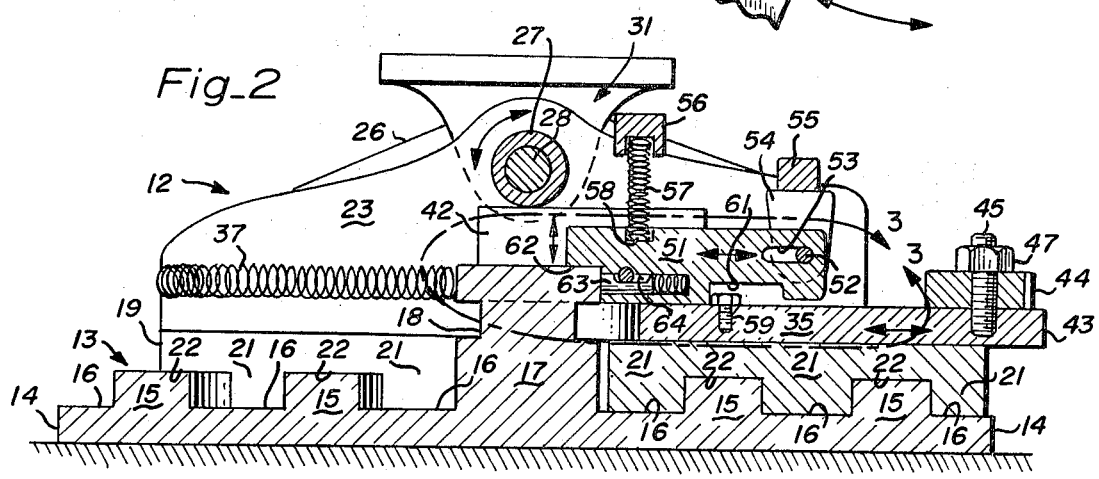
Fig_2

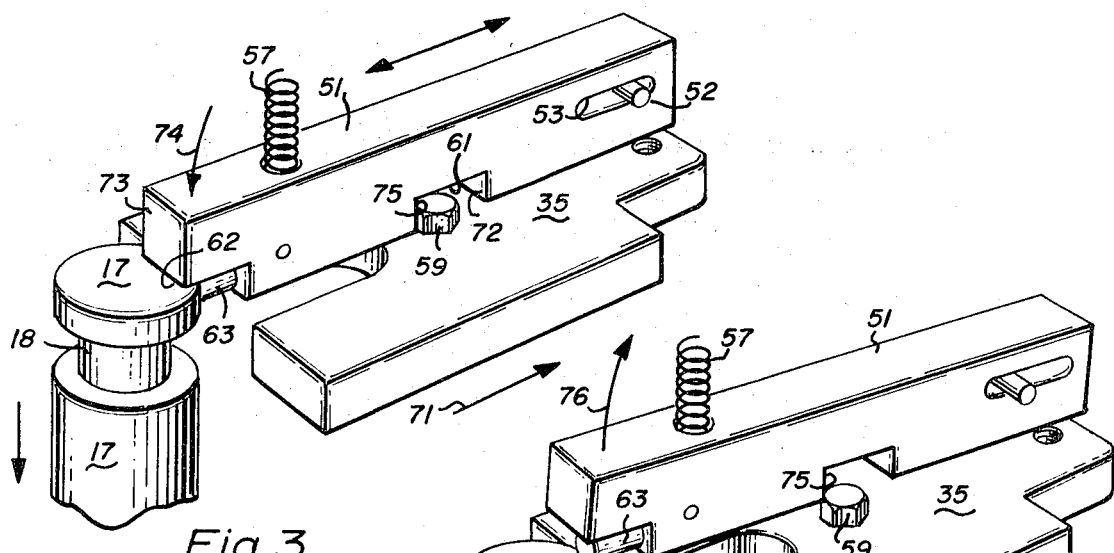
Fig_3
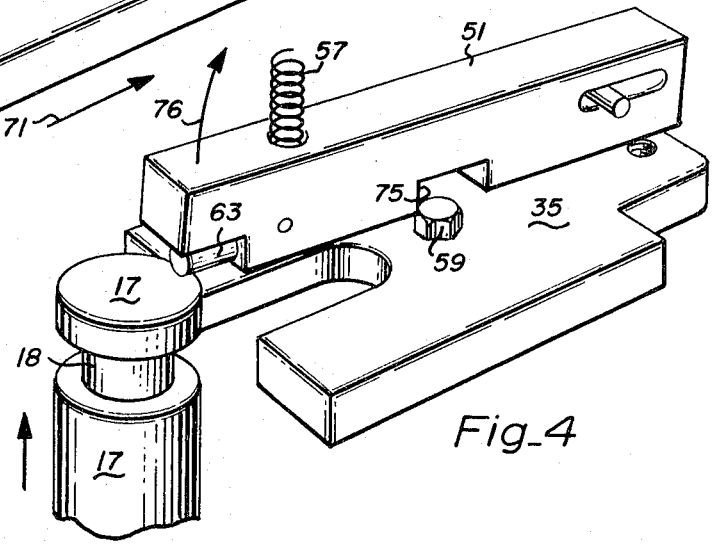
Fig_4
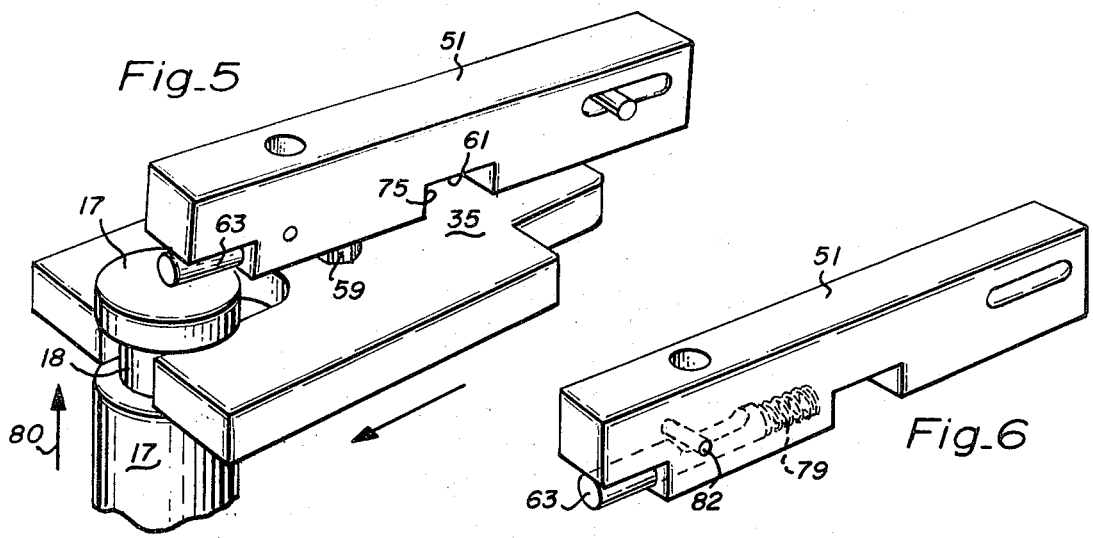
Fig_5
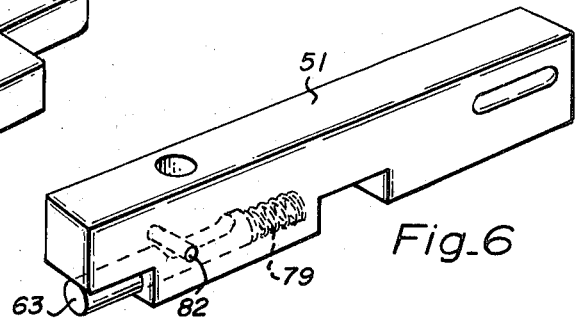
Fig_6
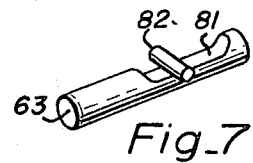
Fig_7

FIFTH WHEEL KING PIN LOCK COMBINATION

BACKGROUND OF THE INVENTION

The present invention relates in general to fifth wheels and more particularly to an improved fifth wheel king pin lock combination having a simplified triggering and latching mechanism.

DESCRIPTION OF THE PRIOR ART

Heretofore, fifth wheel structures have been disclosed which included means for automatically moving a bolt to lock the king pin in place, means for releasing the bolt, and means actuated by the king pin as it moves out of position in the fifth wheel for automatically setting the lock so that it will be ready to lock the next king pin without further attention on the operator's part. Such a king pin lock for fifth wheels is disclosed in U.S. Pat. No. 2,736,574 issued Feb. 28, 1956. While this prior art king pin lock may be suitable for certain types of fifth wheels, it is relatively complex and costly of manufacture. Therefore, it is desired to provide a simplified locking arrangement for a fifth wheel which will be less costly of manufacture.

It is also known from the prior art, in fifth wheel construction, to provide concentric mating lands and grooves in the top and bottom half of the fifth wheel, whereby the driving thrust is transferred from the tractor to the trailer, through the mating lands and grooves as contrasted with exerting the driving thrust on the king pin, whereby damage or shearing of the king pin is avoided in use. Such a fifth wheel construction is disclosed and claimed in U.S. Pat. No. 3,463,512 issued Aug. 26, 1969 and assigned to the same assignee as the present invention.

It is also known from the prior art to provide a lock for such a latter type of fifth wheel wherein a trigger arm extends, in the cocked position, into the locking region to be occupied by the king pin. As the king pin slides into a locking position, the trigger lever is pushed away releasing a catch on a bifurcated locking plate which then slides due to spring bias action into locking engagement with the neck portion of the king pin, thereby locking the king pin to the bottom half of the fifth wheel. Such a fifth wheel and locking apparatus is disclosed and claimed in copending U.S. Application Ser. No. 305,161 filed Nov. 9, 1972 and assigned to the same assignee as the present invention. While this latter type of locking arrangement is particularly suitable for large fifth wheel assemblies as employed for large tractor and semitrailer combinations, it is desired to provide a fifth wheel king pin lock combination particularly suitable for relatively small fifth wheel assemblies as employed, for example, in pickup-semitrailer combinations.

SUMMARY OF THE PRESENT INVENTION

The principal object of the present invention is the provision of an improved fifth wheel king pin lock combination.

In one feature of the present invention, the king pin locking bolt trigger is biased into non-triggering engagement with the previously locked king pin after the bolt has been withdrawn from locking engagement with the king pin but before the king pin is withdrawn. The trigger and its bias are arranged such that the trigger automatically moves into a triggering position upon withdrawal of the previously locked king pin such that upon the next entry of a king pin into the locking mechanism the trigger will be actuated to release the latch and allow the locking bolt to move into locking engagement with the king pin.

In another feature of the present invention, a horizontally slideable and vertically pivotable latch is mounted adjacent the king pin locking bolt with a catch disposed intermediate the latch and the horizontally sliding locking bolt such that upon withdrawal of the locking bolt the latch is also retracted and is biased into a latching position for latching the bolt in a cocked position to allow release of the king pin.

In another feature of the present invention, the trigger is slideably carried from the latch and in the latched position is spring biased against the side of the previously locked king pin such that the king pin can be removed from the locked position without releasing the latch. The trigger moves into a triggering position for triggering the next king pin upon removal of the previously locked king pin.

Other features and advantages of the present invention will become apparent upon a perusal of the following specification taken in connection with the accompanying drawings wherein:

BRIEF DESCRIPTION OF THE DRAWINGS

FIG. 1 is a plan view, partly broken away, of a fifth wheel incorporating features of the present invention, FIG. 2 is a sectional view of the structure of FIG. 1 taken along line 2—2 in the direction of the arrows, FIG. 3 is an enlarged perspective view of a portion of the structure of FIG. 2 delineated by line 3—3, FIG. 4 is a view similar to that of FIG. 3 depicting the position of the elements of FIG. 3 in another phase of the mode of operation of the king pin lock of the present invention, FIG. 5 is a view similar to that of FIG. 4 depicting another phase of the mode of operation of the lock of FIG. 4, FIG. 6 is a perspective view of the combined latch and trigger showing in dotted lines the internal mechanism of the trigger, and FIG. 7 is a perspective view of the trigger portion of the apparatus of FIG. 6.

DESCRIPTION OF THE PREFERRED EMBODIMENTS

Referring now to FIGS. 1 and 2 there is shown a fifth wheel 11 incorporating features of the present invention. More particularly, the fifth wheel 11 includes a top half portion 12 mated with a bottom half portion 13. In a preferred embodiment, the top half portion 12 is mounted to a trailer to receive an upstanding king pin assembly (bottom half portion 13) fixedly secured to the towing vehicle such as a pickup truck via conventional means such as bolts, screws, welding, or the like. The bottom half portion 13 includes a plate 14, as of steel, having a plurality of concentric lands 15 and grooves 16 formed in the upper face thereof, such lands and grooves being concentric with a center king pin 17 having a constricted neck portion 18.

The top half portion 12 includes a base plate 19 having a plurality of concentric downwardly facing lands and grooves 21 and 22 mating with the respective grooves and lands 16 and 15 of the base plate 14 of the bottom half 13. The top half plate 19 includes a plurality of upstanding strengthening ribs 23 and 24 and a pair of edge strengthening ribs 25 and 26 disposed at diametrically opposed peripheral regions of the plate 19. A tubular sleeve 27 extends diametrically across the plate 19 through aligned apertures in the strengthening ribs 23–26. The sleeve 27 is welded to the inside lip of the aligned apertures in the ribs.

A steel axle 28 passes through the sleeve 27 and extends out of the sleeve on opposite ends thereof. The axle 28, at opposite ends, passes through bushings 29 in mounting bracket assemblies 31 which are fixedly secured as by bolts passing through bolt holes 32 to the underside of the trailer vehicle to be towed. The top half assembly 12 is tiltable about the axis of the axle 28. The axle serves to transmit the thrust from the driving vehicle as transmitted through the bottom half 13 to the mating top half 12 and thence via the axle and brackets 31 to the trailer. The tilting motion of the top half 12 about the axle 28 allows for relative changes in attitude between the towing vehicle and the towed vehicle.

A radially directed slot-shaped opening 33 is provided in the forward side of the top half 12. The opening 33 has an outwardly flared entrance for guiding the king pin 17 into the central region of the top half in concentricity with the mating lands and grooves. As the top half 12 is being coupled to the bottom half 13, the bottom surface of the top lands 21 ride over the top surface of the bottom lands 15 in radial slideable engagement. When the king pin 17 reaches the center of the top half 12, the concentric lands and grooves match up and the two halves come together vertically in mating relation such that the driving or towing thrust is transmitted from the bottom half 13 to the top half via the intermediary of the mating lands and grooves, as contrasted with thrust being transmitted through the king pin 17.

The top half is locked in mating engagement with the bottom half 13 by means of a horizontally slideable locking bolt plate 35. The bolt plate 35 is bifurcated at its inner end to define a slot which has inside dimensions to slide around the constricted neck portion 18 of the king pin 17. A pair of tension springs 37 are affixed to the two leg portions 38 of the bolt plate 35 via screw 39. The other end of the tension springs 37 are captured to the outer ends of the strenghtening ribs 23 and 24 via screws 41. The tension springs 37 serve to spring bias the locking bolt 35 toward the central position of locking engagement with the king pin 17. A pair of guide plates 42 are welded to the inside of the respective ribs 23 and 24 overlying the marginal side edges of the bolt plate 35 for holding the sliding bolt plate in vertical registration with the neck portion 18 of the king pin 17 while allowing for radial slideable translation of the bolt plate 35.

The bolt plate 35 includes an outwardly directed tab portion 43 coupled to an actuating lever 44 via a pin 45 passing through an elongated slot 46 in the actuating lever 44. A nut 47 is affixed over the outer end of the pin 45 for retaining the actuating lever 44 in operable engagement with the tab 43 via the pin 45. The actuating lever 44 is pivotably pinned to the plate 19 via pin 48. A nut 49 is secured over the end of the pin 48 for retaining the actuating lever 44 on the pin 48. A suitable handle, not shown, is affixed to the end of the actuating lever 44 for manual cocking of the bolt plate 35 against the spring tension of the springs 37.

A bar shaped latching member 51 is pivotably supported above the horizontally slideable locking bolt plate 35 via a horizontally directed pin 52 passing through an elongated slot 53 near the outer end of the latching bar 51. The pin 52 is held at opposite ends in a pair of brackets 54 depending from one of a pair of transverse bar shaped struts 55 and 56 welded at opposite ends and extending across the space between strengthening ribs 23 and 24. A compression spring 57 is secured to the underside of strut 56 and to the upper side of latching bar 51 at 58 for urging the latching bar 51 into slideable engagement with the bolt plate 35.

A catch in the form of a cap screw 59 is carried on the upper side of the slideable bolt plate 35 for engagement with the end wall of a recess 61 in the under side of the latching bar 51. The inner end of the latching bar 51 is recessed at the underside thereof at 62 and a spring loaded slideable trigger plunger 63 is carried within a longitudinal bore 64 in the latching bar 51.

Referring now to FIGS. 3-7, the mode of operation of the king pin, locking bolt, trigger, and latch will be described in greater detail. More particularly, with reference to FIG. 3, there is shown the relationship of the latching bar 51, king pin 17, and bolt plate 35 at a time just after the actuating lever 44 has been actuated to withdraw the locking bolt plate 35 from locking engagement with the king pin 17 and before the king pin has been withdrawn from the top half 12 of the fifth wheel. As the cocking lever 44 is moved in the clockwise direction, as shown in FIG. 1, the bolt plate 35 is withdrawn in the direction of the arrow 71. As the bolt plate 35 is withdrawn, the catch 59 catches on the outside end wall 72 of the recess 61 on the bottom side of the latching bar 51. When the catch 59 engages wall 72, it causes the latching bar 51 to be coupled to and slide with the bolt plate 35 in the withdrawing direction of the arrow 71. The latch 51 is free to slide because of the elongation of the slot 53 through which the mounting pin 52 passes. The slot 53 has an axial extent sufficient to allow the latching bar 51 to be retracted so that the inner end 73 of the latching bar 51 and the inner end of the trigger pin 63, both of which had been riding on the top of the king pin 17, clear the king pin and the latching bar has been pivoted downwardly, by the spring 57 in the direction of the arrow 74 against the bolt plate 35.

Releasing the manually operated lever 44 allows the tension springs 37 to pull the bolt plate 35 back toward the king pin 17 so that the catch 59 picks up the leading edge 75 of the lower recess 61 in the latching bar 51 and carries the recessed end portion 62 of the latching bar 51 over the top of the king pin 17, thereby causing the trigger plunger 63 to engage the side of the king pin 17 and to compress the trigger plunger 63 into the body of the latching bar 51 as shown in FIG. 3. The inward spring biased movement of the bolt plate 35 and latching bar 51 is limited by the axial extent of the slot 53 in the latching bar 51 and the position of the mounting pin 52. After the inward movement of the latch and bolt plate 35 has been limited, the latch 51 serves to latch the bolt plate 35 against the tension of the springs 37.

Referring now to FIG. 4, there is shown the position of the latching bar 51, trigger 63, bolt plate 35, and king pin 17 as the previously locked king pin 17 is withdrawn from the top half 12. More particularly, the mating lands and grooves are slightly rounded such that in the absence of the lock provided by the bolt plate 35, disengaging thrust transmitted to the lower half 13 relative to the upper half 12 causes the plates to separate in the vertical direction, thereby moving the king pin down and away from the latching bar 51. As this happens, the trigger pin 63 is pushed out to its full extent by the action of the internal spring as more fully disclosed below with regard to FIGS. 6 and 7. The king pin lock is then in position to receive the next king pin to be locked.

As the next king pin 17 enters the locking region of the top half 12, the king pin moves up in the vertical direction relative to the top half, and the top of the king pin 17 engages the trigger 63 which causes the latching bar 51 to be pivoted in the vertical direction as indicated by arrow 76, thereby lifting the forward lip 75 of the recess in the latching bar 51 out of engagement with the catch 59. This releases the bolt plate 35 allowing the tension springs 37 to pull the bolt plate 35 into locking engagement with the neck portion 18 of the king pin 17 as shown in FIG. 5.

The lower half 13 is thus locked to the upper half in a condition of mating rotational engagement. The lock is released by moving the actuating lever 44 in the clockwise direction which serves to cock and latch the bolt plate 35 in the condition as shown in FIG. 3 as previously described.

Referring now to FIGS. 6 and 7, the latching bar 51 is shown in greater detail. The latching bar 51 includes a longitudinally directed cylindrical bore in which the trigger plunger or pin 63 is axially inserted. A compression spring 79 is captured between the inner end of the bore and the inner end of the plunger 63. The top portion of the plunger is recessed at 81 as shown in FIG. 7, and a transverse rolling pin 82 rides in the recess and is captured at its ends in the bar 51. The rolling pin 82 serves to limit the longitudinal motion of the trigger pin 63 as determined by the longitudinal extent of the recess 81.

The advantage of the fifth wheel 11 of the present invention is that it provides a relatively simple and thus less costly fifth wheel locking arrangement. The trigger 63 is combined in the latching bar 51, and the trigger is automatically set by moving the bolt plate 35 to the release position. When the previously locked king pin exits from the top half 12, it automatically resets the trigger 63 to a position of triggering engagement with the next king pin to be locked without any further attention from the operator.

Although, as thus far described, the king pin 17 is shown affixed to the towing vehicle, whereas the pivoted top half is affixed to the trailer to be towed these parts may be reversed such that the king pin 17 depends from the trailer and the pivoted half is affixed to the towing vehicle.

What is claimed is:
1. In a fifth wheel:
first half means for affixing to a first vehicle and having an opening therein to receive a king pin affixed to a second vehicle to be coupled to the first vehicle, said first half means having structure for receiving said king pin in said opening due to relative vertical translation therebetween for effecting coupling engagement between said king pin and said first half means to restrain relative horizontal translation therebetween;

bolt means for movement into said opening in said first half after the king pin has been received therein for locking the king pin to said first half means against vertical movement;

means for biasing said bolt means into said opening in said first half and into locking engagement with the king pin as received in said opening in said first half;

latch means for preventing the biased return of said bolt means after said bolt means has been withdrawn from locking engagement with the king pin;

trigger means for disposition in a first position for triggering engagement with the king pin upon entry of the king pin into locking position in said opening in said first half means for triggering release of said latch means due to said relative vertical translation and allowing said bias means to move said bolt means into locking engagement with the king pin to lock the king pin to said first half, said trigger means adapted for disposition in a second position for non-triggering engagement with an unlocked but previously locked king pin disposed in the locking position; and second bias means for biasing said trigger means into said second position of non-triggering engagement with the previously locked king pin after said bolt means has been withdrawn from locking engagement with the king pin and for automatically urging said trigger means into said first triggering position, upon withdrawal of the previously locked king pin, such that said trigger is positioned for triggering engagement with the next king pin to enter the locking position in said opening in said first half means.

2. The apparatus of claim 1 wherein said bolt means includes a slideable bolt plate having a slot therein, said slot of said bolt plate being dimensioned to slide into a recessed portion of the king pin for locking engagement with the king pin, said latch means being disposed adjacent said bolt plate, catch means disposed intermediate said latch means and said bolt plate for coupling withdrawing movement of said bolt plate into withdrawing movement of said latch means so as to move said latch means back into a latching position for latching with said slideable bolt plate in a non-locking position relative to the king pin.

3. The apparatus of claim 2 including hinge means for pivotably mounting said latch means in relation to said bolt plate so that said catch means will engage said latch means for withdrawal thereof with withdrawal of said bolt plate, and so that said latch means can swing out of latching engagement with said bolt means upon triggering by said trigger means, and means for biasing said latch means into catching engagement with said catch means.

4. The apparatus of claim 3 wherein said trigger means and said second bias means are carried from said latch means, said second bias means urging said trigger means outwardly of said latch means into triggering position in said opening in said first half means upon withdrawal of a previously locked king pin from said opening.

5. The apparatus of claim 1 wherein said latch means comprises an elongated latching member, means for horizontally slideably and vertically pivotably mounting said elongated latching member to said first half in a region adjacent said bolt means, catch means disposed intermediate said elongated latching member and said bolt means for coupling withdrawing motion of said bolt means into withdrawing motion of said elongated latching member, means for basing said vertically pivotably mounted latch member toward said bolt means and into engagement with said catch means, means for movably mounting said trigger means to said elongated latching member so as to capture said trigger means against relative vertical translation relative to said elongated latching member while allowing translation of said trigger axially of said elongated latch member, and means for basing said trigger means toward said opening in said first half means.

6. In a fifth wheel:
- a first half structure adapted to be affixed to a first vehicle and having an opening therein to receive a king pin affixed to a second vehicle;
- a bolt adapted to cut-off a portion of said opening after the king pin has been received in said opening;
- a spring coupled to said bolt to move said bolt to the cut-off position for locking the king pin to said first half structure against vertical motion.
- a latch so positioned that it will move into a position preventing the return of said bolt to the cut-off position after said bolt has been withdrawn from its cut-off position;
- a trigger adapted to extend into a portion of said opening and into a triggering position for engagement with the end of the king pin upon entry of the king pin into a locking position in said opening for triggering the release of said latch and allowing said spring to move said bolt into the cut-off locking position for locking the king pin to said half;
- a second spring coupled to said trigger to move said trigger into the triggering position for engagement with the entering king pin; and
- said trigger being so adapted and arranged that it will move into a non-triggering position of restraining engagement with the side of the king pin after said bolt has been withdrawn from its cut-off locking position but before withdrawal of the unlocked king pin so that upon withdrawal of the king pin from the locking position in said opening and from restraining engagement with said trigger, said second spring moves said trigger into the triggering position for triggering engagement with the end of the next king pin to enter the locking position in said opening.

* * * * *